United States Patent
Sakaguchi et al.

(10) Patent No.: US 6,797,846 B2
(45) Date of Patent: Sep. 28, 2004

(54) FIBROUS CRYSTAL AGGREGATES, PREPARATION METHOD THEREOF AND USE THEREOF

(75) Inventors: Hiroshi Sakaguchi, Tsukuba (JP); Yoshishige Kida, Kashihara (JP); Seizi Iseki, Kashiwara (JP)

(73) Assignees: National Institute of Advanced Industrial Science and Technology, Tokyo (JP); Okamura Oil, Mill, Ltd., Osaka (JP)

( * ) Notice: Subject to any disclaimer, the term of this patent is extended or adjusted under 35 U.S.C. 154(b) by 165 days.

(21) Appl. No.: 10/093,381

(22) Filed: Mar. 11, 2002

(65) Prior Publication Data

US 2002/0160088 A1 Oct. 31, 2002

(30) Foreign Application Priority Data

| Mar. 14, 2001 | (JP) | 2001-073187 |
| Mar. 14, 2001 | (JP) | 2001-073188 |
| Mar. 14, 2001 | (JP) | 2001-073192 |
| Mar. 14, 2001 | (JP) | 2001-073199 |

(51) Int. Cl.$^7$ .............................. C07C 7/20; C07C 9/14; C07C 15/00; C09K 3/32; C02C 1/28
(52) U.S. Cl. .............................. 585/3; 585/2; 585/801; 585/855; 585/864; 585/899; 585/932; 252/184; 516/99; 516/104; 210/690; 210/691; 210/710; 210/711; 210/714; 210/705; 588/901; 588/252; 426/495
(58) Field of Search .......................... 516/99, 104, 21; 585/2, 3, 801, 864, 855, 899, 932; 252/184; 210/705, 710, 711, 714, 690, 691; 588/901, 252

(56) References Cited

U.S. PATENT DOCUMENTS

| 2,648,634 | A | * | 8/1953 | Moore ........................ 508/519 |
| 2,652,365 | A | * | 9/1953 | Moore et al. ................ 508/482 |
| 2,652,366 | A | * | 9/1953 | Jones et al. ................. 508/519 |
| 5,908,377 | A | * | 6/1999 | Fukuda ........................ 516/102 |
| 6,417,415 | B1 | * | 7/2002 | Sakaguchi et al. ............. 585/3 |
| 6,570,045 | B2 | * | 5/2003 | Sakaguchi et al. ............. 585/3 |
| 6,653,355 | B1 | * | 11/2003 | Kasahara et al. ............. 516/21 |

FOREIGN PATENT DOCUMENTS

| JP | 55-75493 A | 6/1980 |
| JP | 56-157492 A | 12/1981 |
| JP | 59-142274 A | 8/1984 |
| JP | 60-67422 A | 4/1985 |

(List continued on next page.)

*Primary Examiner*—Joseph D. Anthony
(74) *Attorney, Agent, or Firm*—Birch, Stewart, Kolasch & Birch LLP

(57) ABSTRACT

A crystal substance formed by precipitating as fibrous aggregates by making a metal aliphatic carboxylate dissolve completely in pure water, stirring, and gradually cooling the resulting solution. A method of preparing the fibrous crystal aggregates. A material for recovering flowing oil and method of recovering flowing oil by using the fibrous crystal aggregates. A material for solidifying liquid hydrocarbon, waste tempura oil and edible oil and method of solidifying liquid hydrocarbon, waste tempura oil and edible oil by using the fibrous crystal aggregates. A method of preparing the solidifying material.

8 Claims, 2 Drawing Sheets

0.1 mm

FOREIGN PATENT DOCUMENTS

| | | |
|---|---|---|
| JP | 60-130543 A | 7/1985 |
| JP | 62-265393 A | 11/1987 |
| JP | 64-4350 A | 1/1989 |
| JP | 1-174595 A | 7/1989 |
| JP | 1-201394 A | 8/1989 |
| JP | 6-55069 A | 3/1994 |
| JP | 7-82209 A | 3/1995 |
| JP | 9-253656 A | 9/1997 |
| JP | 2000-86541 A | 3/2000 |
| JP | 2000-143997 A | 5/2000 |
| JP | 2001-48811 A | 2/2001 |
| JP | 2001-64215 A | 3/2001 |
| JP | 2001-72617 A | 3/2001 |
| JP | 2000-273216 A | 9/2002 |
| JP | 2002-265982 A | 9/2002 |
| JP | 2002-265984 A | 9/2002 |
| JP | 2002-273216 A | 9/2002 |
| JP | 2002-273217 A | 9/2002 |

* cited by examiner 0.1 mm 0.1 mm

US 6,797,846 B2

FIBROUS CRYSTAL AGGREGATES, PREPARATION METHOD THEREOF AND USE THEREOF

This nonprovisional application claims priority under 35 U.S.C. § 119(a) on patent application Ser. Nos. 2001-73187; 2001-73188; 2001-73192; 2001-73199 filed in JAPAN on Mar. 14, 2001; Mar. 14, 2001; Mar. 14, 2001 and Mar. 14, 2001, which is herein incorporated by reference.

FIELD OF THE INVENTION

The present invention relates to fibrous crystal aggregates for efficiently adsorbing and solidifying oil flowing into rivers, lakes, marshes or the ocean; to a method of preparing the same; to the use thereof as an agent for recovering the flowing oil; and to a method of solidifying and recovering the flowing oil by using the recovering material.

Further, the present invention relates to a liquid hydrocarbon-solidifying material for efficiently solidifying liquid hydrocarbon, to a method of preparing the same, and to a method of solidifying liquid hydrocarbon by using the solidifying material.

Further, the present invention relates to a solidifying material for efficiently adsorbing and solidifying waste tempura oil discharged mainly after cooking in home, production of foods, sale, and business activity; and to a method of solidifying and recovering waste tempura oil by using the recovering material.

Further, the present invention relates to an edible oil-solidifying material for efficiently solidifying edible oil, to a method of preparing the same, and a method of solidifying edible oil by using the solidifying material.

BACKGROUND OF THE INVENTION

As the scale of petrochemical industry is enlarging year by year and mass production and mass consumption of organic compounds are conducted for organic compound, environmental pollution and accidents threatening the existence of human beings and living things, such as pollution in rivers, lakes, marshes and sea, fires and explosions attributable to accidents in various chemical factories, petrochemical complexes and tankers, occur frequently worldwide. Accordingly, safe handling of organic compounds including petrochemical materials, and suitable handling during transportation, during storage or after accidents is a critical problem.

One of the fundamental measure against such pollution and accidents is to prevent the accidents themselves by designing an apparatus capable of safe reactions, storage or transportation. The next best measure is to conduct suitable handling immediately after the accidents.

When the surface of the water is polluted by an accident in a chemical factory, a petrochemical complex or a tanker, one of the following two methods has been used in many cases: in one method, the pollutants are left as they are until they are naturally evaporated, diluted or degraded: and in the other method, the pollutants are forcibly diluted by spraying a large amount of surfactants or the like. However, the environment is inevitably adversely affected for a long or short period of time, so it cannot be said that both the methods are satisfactory. In an alternative method, flowing oil is enclosed with an oil fence and scooped up together with polluted seawater by an oil-recovering ship, then the oil is separated from seawater by using a difference in density, and the seawater is returned to the sea. However, this method is poor in efficiency, resulting in permitting a majority of the flowing oil to spread and failing to recover it completely, thus allowing the pollutants to be left as they are.

Degradation of flowing oil by microorganisms living in seawater is also attempted, but this attempt is at the experimental stage and far from being practical.

In consideration of these circumstances, there is demand for development of a technique by which oil flowing into rivers, lakes, marshes or the sea is rapidly adsorbed and recovered as it is if possible.

The requirements for a material for adsorbing oil flowing into the sea include: (1) the adsorbing material can act with its functions not deteriorated by salts in seawater, and can be easily recovered together with oil, and the recovered adsorbing material is usable through recycling, (2) the adsorbing material is chemically relatively stable, and (3) the adsorbing material is supposed to be used in a large amount, and should thus be a safe and nontoxic substance, and even if the material flows into the ocean and hardly recovered, the material itself is least dangerous to living things in the ocean and to the environment.

Further, when oil flows into fresh water or hard water in rivers, lakes, marshes and the like, it is necessary that the adsorbing agent (adsorbent) can act efficiently without being influenced by the type and concentration of ions contained in the water, thus functioning in the same manner as in seawater.

It is hard to say that such physicochemical adsorbing materials including those commercially available as gelling agents are sufficiently practically usable, since they are very poor in efficiency.

Further, one of fundamental measures against accidents such as the above-described explosions, fires, leakage and the like, is that a large amount of liquid hydrocarbon and mixtures thereof handled in various chemical factories, petrochemical complexes and tankers are converted into safe solids and returned if necessary to the original liquid ones. By conversion thereof into safe solids easy to handle, it is thought that many accidents would be prevented, while huge and often dangerous storage facilities, pipelines, trucking, freezing, thermally insulating facilities and the like could be significantly modified.

In consideration of these aspects, there is demand for development of a method wherein a wide variety of hydrocarbon and mixed oil handled in various chemical factories, petrochemical complexes and tankers are solidified and converted easily into safe forms and returned if necessary to the original liquid hydrocarbon.

The requirements for a material for solidifying liquid hydrocarbon include (1) liquid hydrocarbon can be solidified easily at room temperatures without damaging reaction units in a factory, and from the solidified complex, the original liquid hydrocarbon can be easily recovered, and further the recovered solidifying material is usable through recycling, (2) the solidifying material is chemically relatively stable, and (3) the solidifying material is supposed to be used in a large amount, and should thus be a safe and nontoxic substance, and even if the material flows outside of the reaction unit and hardly recovered, the material itself is least dangerous to living things in the environment and to the environment.

Such physicochemical adsorbing materials are still not put to practical use, and there are few proposals including those at the experimental stage.

Besides, as our eating habits in home become rich and food industries become prosperous, a large amount of waste tempura oil is discharged into sewage and the like, which raises a social problem as a cause of environmental pollution.

Materials for physicochemically adsorbing waste tempura oil have been commercially available, but are still not satisfactory, because troublesome and dangerous heating for solidification is necessary, the solidifying materials themselves have a problem in safety, and a large amount of solidifying materials is needed in comparison with waste tempura oil.

On the other hand, a wide variety of edible oil has come to be used to enrich our life. A wide variety of edible oils which differs in characteristics such as nutritive value, flavor, feeling in eating and the like have been produced, but the field of application as food is restricted and narrowed by the oils being liquid. It is estimated that if edible oil can be solidified or gelled with maintaining their original characteristics, their value in practical use can be significantly improved.

Such satisfactory materials for physicochemical solidification are still not known.

SUMMARY OF THE INVENTION

Accordingly, an object of the present invention is to provide novel fibrous crystal aggregates usable as an absorbing material for oils satisfying the requirements described above. Another object of the present invention is to provide a method of preparing the fibrous crystal aggregates from a metal carboxylate. A further object of the present invention is to provide a method of efficiently recovering oils flowing into rivers, lakes, marshes or the ocean by physicochemical adsorption.

Another object of the present invention is to provide a material for solidifying liquid hydrocarbon, which satisfies the requirements described above. A further object of the present invention is to provide a method of preparing the material for solidifying liquid hydrocarbon. A still further object of the present invention is to provide a method of solidifying liquid hydrocarbons efficiently by a physicochemical method.

Another object of the present invention is to provide a solidifying material which can, in a small amount, solidify waste tempura oils, at room temperature, safely and easily, in easy procedures. A still other object of the present invention is to provide a method of solidifying waste tempura oil easily at ordinary temperature.

A further object of the present invention is to provide an edible oil-solidifying material which can, in a small amount, solidify edible oil at room temperature to about −20° C., safely and easily, in easy procedures. A still further object of the present invention is to provide a method of preparing the edible oil-solidifying material. A still further object of the present invention is to provide a method of solidifying edible oil easily.

Other and further objects, features, and advantages of the invention will appear more fully from the following description, taken in connection with the accompanying drawings.

DETAILED DESCRIPTION OF THE INVENTION

Figure 1:
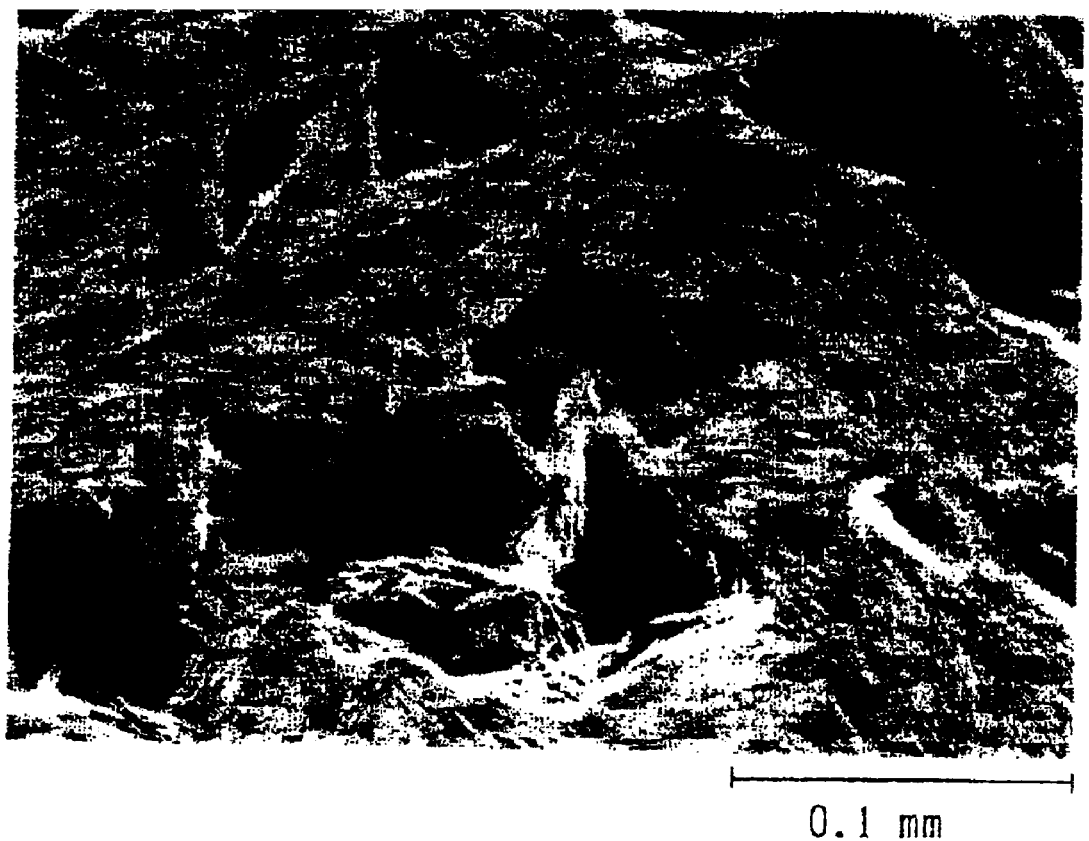
FIG. 1 is a microphotograph of the fibrous crystal aggregates obtained in Example 1.

The present inventors have studied the dissolution, emulsification and dispersion behavior, in water, of aliphatic carboxylic acid type compounds (particularly metal carboxylates) having alkyl groups of various lengths. As a result, we have found that these carboxylic acid type compounds are dissolved completely in water at a high temperature; the compounds after completely dissolved can be maintained in a completely dissolved state even if an aqueous solution of an inorganic salt, such as sodium chloride, is added thereto at a high temperature; by stirring and gradually cooling the compounds in a completely dissolved state, the carboxylic acid type compounds are precipitated, for the first time, as aggregates of fine and uniform fibrous crystals; and such fibrous crystal aggregates can particularly efficiently adsorb and solidify various pure hydrocarbon, mixed oils such as gas oil (light oil), oil fuel (heavy oil) and the like, waste tempura oils and edible oils. The present invention is accomplished by further studies based on these findings.

According to the present invention, there are provided the following means:

(1) A crystal substance, which is formed by precipitating as fibrous aggregates by making a metal aliphatic carboxylate dissolve completely in pure water to give a solution, stirring, and gradually cooling the solution;

(2) A material for recovering oil flowing into rivers, lakes, marshes or the sea, which comprises the fibrous crystal aggregates according to the above (1);

(3) A crystal substance, which is prepared by precipitating as fibrous aggregates by making a metal aliphatic carboxylate dissolve completely in pure water to give a solution, adding an aqueous solution of an inorganic salt such as sodium chloride containing the same metal as in the metal aliphatic carboxylate, stirring, and gradually cooling the solution;

(4) A material for recovering oil flowing into rivers, lakes, marshes or the sea, which comprises the fibrous crystal aggregates according to the above (3);

(5) A method of recovering flowing oil, which comprises the step of: solidifying oil flowing into rivers, lakes, marshes or the sea, by using the recovering material comprising fibrous crystal aggregates according to the above (2) or (4);

(6) A method of recovering flowing oil, which comprises the steps of: heating a solidified material containing flowing oil, obtained by the method according to the above (5), to decompose and separate the solidified material into its original metal aliphatic carboxylate and flowing oil, and recovering them;

(7) A method of preparing a fibrous crystal substance, which comprises the step of: making a metal aliphatic carboxylate dissolve completely in pure water to give a solution, stirring, and gradually cooling the solution, thereby precipitating as fibrous aggregates;

(8) A method of preparing a fibrous crystal substance, which comprises the steps of: making a metal aliphatic carboxylate dissolve completely in pure water to give a solution, adding an aqueous solution of an inorganic salt, such as sodium chloride, containing the same metal as in the metal aliphatic carboxylate, stirring, and gradually cooling the solution, thereby precipitating as fibrous aggregates;

(Hereinafter, the means described in the above (1) to (8), are collectively referred to as a first embodiment of the present invention.)

(9) A material for solidifying liquid hydrocarbon, which comprises fibrous crystal aggregates formed by. precipitating by making a metal aliphatic carboxylate dissolve completely in pure water to give a solution, stirring, and gradually cooling the solution;

(10) A material for solidifying liquid hydrocarbon, which comprises fibrous crystal aggregates formed by precipitating by making a metal aliphatic carboxylate dissolve completely in pure water to give a solution, adding an aqueous solution of an inorganic salt, such as sodium chloride, containing the same metal as in the metal aliphatic carboxylate, stirring, and gradually cooling the solution;

(11) A method of solidifying liquid hydrocarbon, which comprises the step of: solidifying liquid hydrocarbon, by using the fibrous crystal aggregates according to the above (9) or (10);

(12) A method of solidifying liquid hydrocarbon, which comprises the steps of: heating a solidified complex containing solidified liquid hydrocarbon, obtained by the method according to the above (11), to decompose and separate the solidified complex into its original metal aliphatic carboxylate and liquid hydrocarbon, and recovering them;

(13) A method of preparing a material for solidifying liquid hydrocarbon, which comprises the steps of: making a metal aliphatic carboxylate dissolve completely in pure water to give a solution, stirring, and gradually cooling the solution, thereby precipitating as fibrous aggregates;

(14) A method of preparing a material for solidifying liquid hydrocarbon, which comprises the steps of: making a metal aliphatic carboxylate dissolve completely in pure water to give a solution, adding an aqueous solution of an inorganic salt such as sodium chloride containing the same metal as in the metal aliphatic carboxylate, stirring, and gradually cooling the solution, thereby precipitating as fibrous aggregates;

(Hereinafter, the means described in the above (9) to (14), are collectively referred to as a second embodiment of the present invention.)

(15) A material for solidifying waste tempura oil, which comprises fibrous crystal aggregates formed by precipitating by making a metal aliphatic carboxylate dissolve completely in water to give a solution, stirring, and gradually cooling the solution;

(16) A material for solidifying waste tempura oil, which comprises fibrous crystal aggregates formed by precipitating by making a metal aliphatic carboxylate dissolve completely in water to give a solution, adding an aqueous solution of an inorganic salt such as sodium chloride containing the same metal as in the metal aliphatic carboxylate, stirring, and gradually cooling the solution;

(17) A method of solidifying waste tempura oil, which comprises the step of: adding the material for solidifying according to the above (15) or (16) to waste tempura oil, to solidify the waste tempura oil.

(Hereinafter, the means described in the above (15) to (17), are collectively referred to as a third embodiment of the present invention.)

(18) A material for solidifying edible oil, which comprises fibrous crystal aggregates formed by precipitating by making a metal aliphatic carboxylate dissolve completely in pure water to give a solution, stirring, and gradually cooling the solution;

(19) A material for solidifying edible oil, which comprises fibrous crystal aggregates formed by precipitating by making a metal aliphatic carboxylate dissolve completely in pure water to give a solution, adding an aqueous solution of an inorganic salt, such as sodium chloride, containing the same metal as in the metal aliphatic carboxylate, stirring, and gradually cooling the solution;

(20) A method of solidifying edible oil, which comprises the step of: solidifying edible oil, by using the fibrous crystal aggregates according to the above (18) or (19);

(21) A method of solidifying edible oil, which comprises the step of: heating a solidified complex containing solidified edible oil, obtained by the method according to the above (20), to decompose the solidified complex to regenerate to its original metal aliphatic carboxylate and edible oil;

(22) A method of preparing a material for solidifying edible oil, which comprises the steps of: making a metal aliphatic carboxylate dissolve completely in pure water to give a solution, stirring, and gradually cooling the solution, thereby precipitating as fibrous aggregates; and

(23) A method of preparing a material for solidifying edible oil, which comprises the steps of: making a metal aliphatic carboxylate dissolve completely in pure water to give a solution; adding an aqueous solution of an inorganic salt, such as sodium chloride, containing the same metal as in the metal aliphatic carboxylate, stirring, and gradually cooling the solution, thereby precipitating as fibrous aggregates.

(Hereinafter, the means described in the above (18) to (23), are collectively referred to as a fourth embodiment of the present invention.)

Hereinafter, the present invention includes the above first, second, third and fourth embodiments, unless otherwise specified.

The fibrous crystal aggregates of the present invention, as an example thereof is shown in the drawings in connection with the Examples described later, are aggregates of innumerable fine fibrous crystals, and the thickness of one fibrous crystal is preferably 1 $\mu$m or less, and the length thereof is preferably 50 to 1000 $\mu$m, more preferably 100 to 500 $\mu$m. Further, one fibrous crystal is composed of a large number of finer fibrous crystals.

In the present invention, the crystals comprising fibrous aggregates to be solidified upon adsorption of flowing oils in the first embodiment, the crystals comprising fibrous aggregates acting as a material for solidifying liquid hydrocarbon in the second embodiment, the crystals comprising fibrous aggregates acting as a material for solidifying waste tempura oil in the third embodiment, and the crystals comprising fibrous aggregates acting as a material for solidifying edible oil in the fourth embodiment are formed by heating and dissolving a metal aliphatic carboxylate in pure water or water, or dissolving a metal aliphatic carboxylate in pure water or water and then adding an aqueous solution of an inorganic salt (such as a sodium salt (e.g., sodium chloride, sodium sulfate, sodium carbonate and the like), a potassium salt (e.g., potassium chloride and the like) a lithium salt (e.g., lithium chloride and the like) and the like containing the same metal as in the metal aliphatic carboxylate, followed by stirring and gradual cooling thereof. The fibrous crystal aggregates are maintained stably in the form of a dispersion of the fibrous crystal aggregates for a long period usually at room temperature or lower.

As used herein, the liquid hydrocarbon refers to that in the form of liquid at ordinary temperature (20° C.) at normal pressure (0.1 MPa).

As used herein, the waste tempura oil refers not to edible oil itself, but to used tempura oil including oil discolored by oxidation in the air, or partially degraded, after heated and used, and oil slightly darkened, or having increased viscosity through repeated use, and the like. The waste tempura oil may be composed of 100% waste tempura oil or of waste tempura oil mixed with water, egg yellow, wheat flour and the like.

In the present invention, solidification means that flowing oils, liquid hydrocarbon, waste tempura oil or edible oil is solidified by forming a complex with the fibrous crystal aggregates.

The metal aliphatic carboxylate (also referred to, in the present invention, as metal carboxylate) used in the present invention is a metal carboxylate preferably having a linear alkyl chain. The number of carbon atoms in the metal carboxylate is preferably 6 to 30, more preferably 8 to 22 and most preferably 10 to 18. A kind of the metal thereof is preferably sodium, potassium or lithium, more preferably sodium or potassium. That is, the alkyl chain should have such suitable length that the metal carboxylate is completely dissolved in pure water or water by heating, and then stirred and gradually cooled as it is or after addition of an aqueous solution of an inorganic salt such as sodium chloride and the like containing the same metal as in the metal aliphatic carboxylate, whereby the metal carboxylate can be precipitated in a fibrous form.

In the case of a sodium carboxylate having a linear alkyl group where the number of carbon atoms is 6 to 10, it may be necessary to increase the concentration of sodium chloride or hydrated sodium sulfate or to cool the compound at room temperature or less. When the number of carbon atoms is 19 or more, it is necessary to heat the compound at 100° C. or more or to decrease the concentration of sodium chloride, in order to dissolve the compound completely.

This also applies to a potassium or lithium carboxylate having a liner alkyl group.

The examples of the metal carboxylate which can be used in the present invention include, for example, sodium octanoate, sodium nonanoate, sodium decanoate, sodium undecanoate, sodium dodecanoate, sodium tridecanoate, sodium tetradecanoate, sodium pentadecanoate, sodium hexadecanoate, sodium heptadecanoate, sodium octadecanoate, potassium tetradecanoate, potassium hexadecanoate, potassium octadecanoate, lithium hexadecanoate and the like.

Sodium aliphatic carboxylates have been used as soap for a long time, and their safety is proven. Potassium aliphatic carboxylates have also been used widely as medicated soap, and their safety is also proven. Further, lithium aliphatic carboxylates have also been industrially used, and their safety is confirmed. Further, sodium and potassium are contained originally in the environmental water including seawater in large quantities, and even if they flow and remain in the sea, the environment is not adversely affected. Further, sodium and potassium are also contained at various concentrations in rivers, lakes and marshes, and even if they flow and remain at a concentration of extent included already there, the environment is not adversely affected.

The aqueous solution of sodium chloride used in the present invention is produced by dissolving various amounts of sodium chloride in pure water or water. The aqueous solution is generally effective at concentrations ranging from a low concentration where sodium is slightly dissolved in water to the upper limit of the solubility thereof, but it is essential that depending on combination with the metal carboxylate, the concentration of the aqueous solution be high enough for crystals to be precipitated as fibrous aggregates, and the precipitated fibrous crystal aggregates be solidified effectively, depending on its use, by reacting with flowing oil in the first embodiment, liquid hydrocarbon in the second embodiment, waste tempura oil in the third embodiment or edible oil in the fourth embodiment. Further, sodium chloride is not always necessary to be pure, but sodium chloride may be present as a constituent component of seawater or natural water, be nontoxic to humans and other living things and be dissolved at a concentration where the dissolved carboxylate can be precipitated. Further, seawater itself or artificial seawater may be used as it is. However, in the fourth embodiment, in consideration that sodium chloride used in the material for solidifying edible oil is added to foods, it is preferable that sodium chloride is used at high purity or usual levels in foods, or natural water confirmed to be safe or natural water of known taste as drinking water is used. This also applies to other inorganic metal salts.

In the method of preparing the fibrous crystal aggregates and the solidifying material according to the present invention, it is particularly important that first the metal carboxylate described above is completely dissolved in pure water or water, and if necessary an aqueous solution containing metal ions is added thereto and completely mixed therewith, followed by stirring and gradual cooling thereof, whereby crystals are precipitated as fibrous aggregates in the aqueous solution.

By use of the crystals as fibrous aggregates, it becomes possible to adsorb flowing oils, liquid hydrocarbon, waste tempura oil and edible oil efficiently, and thereby to recover the oils as macroscopic mass. It is considered this occurs because the crystals as fibrous carboxylate aggregates of metal carboxylate have a large surface area to permit flowing oil, liquid hydrocarbon, waste tempura oil or edible oil to be efficiently adsorbed therein, and the resultant oil-adsorbed materials are attracted to one another via van der Waals force, to grow finally as solid materials which can be recovered easily even by e.g. a net or hand.

In the case of edible oils, the recovered product can be converted into new solid foods.

In the process of the present invention, the embodiments for preparing the material for adsorbing flowing oils in the first embodiment, the material for solidifying liquid hydrocarbon in the second embodiment, the material for solidifying waste tempura oil in the third embodiment, and the material for solidifying edible oil in the fourth embodiment, each of which is comprised of the fibrous crystal aggregates, are as follows:

(1) A process wherein a metal carboxylate is added to pure water or water, completely dissolved by heating, and then the mixture is cooled gradually to room temperature under vigorous stirring;

(2) A process wherein a metal carboxylate is added to pure water or water and completely dissolved by heating, and after a previously heated aqueous solution of sodium chloride is added thereto, the mixture is cooled gradually to room temperature under vigorous stirring;

(3) A process wherein an aqueous solution of various metal salts (an aqueous solution of metal salts nontoxic to the human body), seawater or artificial seawater is used in place of the aqueous solution of sodium chloride in the process (2); and (4) A process wherein after the solution is cooled to room temperature in the process (2) or (3), the solution is further kept at about 0° C. for, a long time, to precipitate crystals consisting of fibrous aggregates.

Further, there is (5) a process wherein crystals of mixed fibrous aggregates of plural types of carboxylates are precipitated by using the processes (1) to (4).

The molar ratio of metal carboxylate/water in precipitating the fibrous crystal aggregates in the present invention is preferably from $0.1/1000$ to $10/1000$, more preferably from $0.5/1000$ to $2/1000$. Further, the molar ratio of inorganic metal salt/water in precipitating the fibrous crystal aggregates is preferably from $0/1000$ to the saturation concentration during heating.

Furthermore, the embodiment is described in more detail. First, heating is carried out in the present invention in order to dissolve the carboxylate completely in pure water or water. The heating temperature is varied depending on the type of metal carboxylate used. For example, sodium carboxylates ranging from sodium pentadecanoate to octadecanoate are heated at 90 to 99° C. for about 30 minutes. Carboxylates having a shorter chain may be heated at lower temperatures. Carboxylates having a longer chain should be heated at a high temperature of 100° C. or more in a pressure-resistant vessel in some cases. In either case, after the metal carboxylate is completely dissolved by heating, the resulting solution is vigorously stirred; or after a heated aqueous solution of sodium chloride or an aqueous solution of various metal salts is added, the mixture is vigorously stirred vigorous stirring is continued until the temperature of the solution is lowered to room temperature.

In the manner described above, very fine and fibrous crystal aggregates can be precipitated.

The fibrous crystal aggregates thus formed can be separated from the seawater, the aqueous solution and the like by a usual means such as centrifugation and the like or scooping the fibrous crystal aggregates up from the aqueous solution of metal salts, but usually the fibrous crystal aggregates are used with the condition which dispersed in water. In this case, the water content is not limited, but is preferably 80 to 99% by weight in the hydrous fibrous crystal aggregates. Accordingly, the water content may be lowered just before use. Once formed, the fibrous crystal aggregates are very stable and usually maintained stably even at room temperature for a long time or even at high temperatures. For example, fibrous crystal aggregates obtained from sodium pentadecanoate are very stable usually at a temperature of up to 60° C.

In the first embodiment of the invention, the fibrous crystal aggregates formed by the process of the present invention described above are merely introduced into e.g. seawater polluted with oil fuel thereby selectively adsorbing the oil fuel. Unless the ratio of oil fuel to the fibrous crystal aggregates is too high, the fibrous crystal aggregates adsorb all oil fuel substantially to float on the cleaned seawater. The fibrous crystal aggregates after having adsorbed oil fuel in a lower ratio of the oil fuel float on the sea as fine particle aggregates, but when the ratio of oil fuel by weight is higher by several times than the fibrous crystal aggregates, the aggregates float on the sea as wholly rigid and strong spherical mass (or egg-shaped mass). The mass is maintained in a solid form and can be separated from the seawater by scooping it up with a usual means using a net, a rake and the like.

The flowing oils or liquid hydrocarbon which can be adsorbed and recovered by the recovering material consisting of the fibrous crystal aggregate of the present invention in the first and second embodiments include mixed oil such as oil fuel A, oil fuel C, crude oil, liquid paraffin, gas oil, kerosene and the like, and a wide variety of purified hydrocarbon, that is, aliphatic or aromatic hydrocarbons such as n-paraffins, olefins, branched paraffins, cyclohexane and the like. Depending on the type of flowing oils or liquid hydrocarbon to be recovered, generally 10 to 70 g, preferably 10 to 30 g of flowing oils or liquid hydrocarbon can be adsorbed by 1 g of the fibrous crystal aggregates of the present invention. To allow the fibrous crystal aggregates of the present invention to adsorb flowing oils or liquid hydrocarbon, the fibrous crystal aggregates may be contacted with flowing oils or liquid hydrocarbon preferably for 1 minute or more, more preferably with gentle shaking.

If the oil adsorbed is not a mixed oil, such as oil fuel and the like, hardly separated, the solids (solid aggregates) which have adsorbed the flowing oils or liquid hydrocarbon can be separated into the respective components i.e. the metal carboxylate and recovered oils or liquid hydrocarbon by mere heating or by heating after separation and recovery from the flowing water and subsequent addition of water. The metal carboxylate is separated and transferred to the aqueous phase, while the oils or liquid hydrocarbon can be separated and recovered from the aqueous phase. A majority of the metal carboxylates can be used again and repeatedly for producing of fibrous crystal aggregates usable as the adsorbing material for flowing oils or liquid hydrocarbon. Usually, heating for decomposition and separation is conducted preferably at 80° C. or more. According to the solidifying material in the second embodiment of the present invention, liquid hydrocarbon can be adsorbed at room temperature.

In the third and fourth embodiments, the fibrous crystal aggregates formed by the process of the present invention as described above are merely introduced into waste tempura oil or edible oil at ordinary temperature thereby selectively adsorbing the waste oil or edible oil. Unless the ratio of waste tempura oil or edible oil to the fibrous crystal aggregates is too high, the fibrous crystal aggregates adsorb all tempura oil or edible oil substantially to form ball-shaped solids, thus floating on water mixed therewith. If the solidified complex thus formed is used as a food made of solidified edible oil, other oil-soluble foods, food additives and the like may be added depending on the intended use of the solidified food. The solid is maintained in a solid form and can be scooped up by hand or a usual means such as a dipper.

The waste tempura oil or edible oil which can be solidified by the solidifying material in the third and fourth embodiments of the present invention includes soybean oil, cottonseed salad oil, rapeseed oil, corn oil, safflower salad oil, palm oil, sunflower oil, rice oil, sesame oil, olive oil and the like. Depending on the type of waste tempura oil or edible oil to be solidified, 10 to 50 g, preferably 10 to 30 g waste tempura oil or edible oil can be adsorbed usually by 1 g of the solidifying material in the third and fourth embodiments of the present invention. To allow the solidifying material in the third embodiment of the present invention to adsorb waste tempura oil, the solidifying material consisting of fibrous crystal aggregates may be contacted with waste tempura oil preferably for 1 minute or more at room temperature, more preferably with gentle shaking or stirring. On the other hand, to allow the solidifying material in the fourth embodiment of the present invention to adsorb edible oil, the solidifying material may be contacted with edible oil preferably for 1 minute or more in the range of room temperature to −20° C., more preferably with gentle shaking or stirring.

The solidified complex formed after solidification of the edible oils can be separated into the respective components i.e. the metal carboxylate and solidified edible oils by gently heating the complex at a temperature not causing a deterioration in the properties and flavor of the original edible oil. The metal carboxylate is separated and transferred to the aqueous phase, while the edible oils can be separated from the aqueous phase and returned to the original edible oil.

Further, a majority of the metal carboxylates can be used again and repeatedly for producing fibrous crystal aggregates usable as the material for solidifying edible oil. Usually, heating for decomposition and separation is conducted at 80° C. or less.

The fibrous crystal aggregates of the present invention obtained by dispersing a metal aliphatic carboxylate in an aqueous solution of a metal salt can be used as a material for adsorbing oils, a material for solidifying liquid hydrocarbon, a material for solidifying waste tempura oil, a material for solidifying edible oil, and the like.

According to the first embodiment of the present invention, flowing oils allowed to contact therewith in rivers, lakes, marshes or the ocean can be adsorbed selectively, efficiently and physicochemically. Further, according to the second embodiment of the present invention, liquid hydrocarbon can be adsorbed selectively, efficiently and physicochemically. The recovering material on the liquid-hydrocarbon solidifying material comprising the fibrous crystal aggregates of the present invention is maintained in a solid form (usually in a ball- or egg-shaped form) by adsorption of flowing oils or liquid hydrocarbon to float on the water, so after adsorption, the material can be easily recovered from the water or seawater. This adsorbing or solidifying material is composed of only a very safe metal aliphatic carboxylate and an aqueous solution of a metal salt. Accordingly, even if flowing out, environmental pollution of natural water and the like caused by the adsorbing or solidifying material itself can also be prevented. Further, the fibrous crystal aggregates of the present invention and the material for recovering flowing oil or the material for solidifying liquid hydrocarbon comprising the same can be easily handled because it can be kept stably for a long period of time in the form of a dispersion of the fibrous crystal aggregates in water at room temperature. When these materials are allowed to adsorb oils other than oil fuel, they can be separated by heating into the metal carboxylate and recovered oils or solidified liquid hydrocarbon, and the flowing oil and liquid hydrocarbon can be recovered in the original state, further the metal carboxylate can be reutilized for production of the fibrous crystal aggregates and the material for recovering flowing oil or the material for solidifying liquid hydrocarbon comprising the same.

The method of recovering flowing oils by using such fibrous crystal aggregates in the first embodiment of the present invention is suitable for handling of flowing-oil accidents. Further the method of solidifying liquid hydrocarbon by using such fibrous crystal aggregates in the second embodiment of the present invention can be carried out effectively and easily by utilizing physiochemical adsorption, which is suitable as a method of transporting liquid hydrocarbon or handling for storage thereof.

Further, the solidifying material consisting of the fibrous crystal aggregates in the third embodiment of the present invention can be maintained in a solid state by adsorption of waste tempura oil and discharged easily and safely as it is without polluting the environment. Accordingly, pollution of the natural environment can also be prevented. Waste tempura oil thus solidified can also be reutilized by conversion into soap and the like. Further, the solidifying material consisting of the fibrous crystal aggregates of the present invention can be maintained stably for a long period of time in the form of a dispersion of the fibrous crystal aggregates at room temperature, thus permitting it to be handled easily and stored safely for a long period.

The method of solidifying waste tempura oil according to the present invention by using the solidifying material consisting of such fibrous crystal aggregates is suitable for handling of waste oil from home, waste oil from food factories, waste oil discharged from cookrooms in restaurants and the like.

Further, the material for solidifying edible oil consisting of the fibrous crystal aggregates obtained by dispersing a metal aliphatic carboxylate in an aqueous solution of a metal salt in the fourth embodiment of the present invention can be maintained in a solid state (usually in a ball or egg form) by adsorption of edible oil, and can solidify the edible oil easily and safely, to convert it into new foods. Further, the material for solidifying edible oil consisting of the fibrous crystal aggregates of the present invention can be maintained stably for a long period of time in the form of a dispersion of the fibrous crystal aggregates at room temperature, thus permitting it to be handled easily and stored safely for a long period. Further, it is possible to separate into the metal carboxylate and solidified edible oil by heating, so the edible oil can be returned in the original state, while the metal carboxylate can be reutilized for production of the material for solidifying edible oil consisting of the fibrous crystal aggregates.

The method of solidifying edible oil according to the present invention by using such fibrous crystal aggregates can solidify edible oil harmlessly and safely without a deterioration in the properties of-the edible oil, so this method is suitable not only as a method of handling for storage and transportation but also as a method of producing of a new oily solid food.

The present invention will be described in more detail based on examples given below, but the present invention is not limited by these examples.

EXAMPLES

Example 1

132 mg (0.0005 mole) sodium pentadecanoate in a high purity (99% or more) and 4.5 ml (0.25 mole) pure water were weighed and placed in a glass vessel, sealed and heated at 95° C., whereby the sodium pentadecanoate was completely dissolved. Separately, an aqueous solution prepared by completely dissolving 58.5 mg (0.010 mole) sodium chloride in 4.5 ml (0.25 mole) pure water was heated at 95° C. Both the solutions were mixed at 95° C., and immediately the mixture was vigorously stirred. The mixture was stirred for about 20 minutes until the mixture was cooled to room temperature, whereby very fine and uniform fibrous crystal aggregates were precipitated throughout the solution. By leaving it at room temperature for 1 day, the fibrous crystal aggregates were made more stable and tried to gather on the water by attraction of the aggregates to one another maintaining the form of fine crystals, thus made the aqueous solution slightly colorless and transparent in a lower part. A microphotograph of the fibrous crystal aggregates of sodium pentadecanoate thus prepared is shown in FIG. 1 (×40).

1.5 g oil fuel C was added to the liquid in which the fibrous crystal aggregates were dispersed and gently shaken, whereby the oil fuel was dispersed as fine black droplets throughout the white liquid in which the fibrous crystal aggregates were dispersed, and then the fibrous crystal aggregates of the sodium pentadecanoate and the fine droplets of the oil fuel started mutually to aggregate to form huge rigid ball-shaped aggregates (solids) as a whole. The remaining aqueous solution of sodium chloride was free of sodium pentadecanoate and oil fuel and completely colorless and transparent. Further, the huge rigid ball-shaped solids contained little water.

Example 2

The same procedure as in Example 1 was conducted except that 139 mg (0.0005 mole) sodium hexadecanoate was used in place of sodium pentadecanoate, and as a result, very fine and uniform fibrous crystal aggregates were precipitated completely similarly throughout the solution. 1.5 g oil fuel C was added thereto, and the mixture was gently shaken, to form stable and rigid ball-shaped solids, and the separated aqueous solution of sodium chloride was also colorless and transparent.

Example 3

The same procedure as in Example 1 was conducted except that pure water or seawater was used in place of the aqueous solution of sodium chloride, and as a result, the same result was obtained until the quantity of addition of oil fuel C was from 10 to 70 times in weight ratio.

Example 4

The same procedure as in Example 1 was conducted except that 0.0005 mole of sodium undecanoate, sodium dodecanoate, sodium tridecanoate, sodium tetradecanoate, sodium heptadecanoate or sodium octadecanoate was used respectively in place of sodium pentadecanoate, and as a result, rigid and stable ball-shaped solids were obtained until oil fuel C was 15.3, 13.5, 9.2, 10.2, 11.5 and 11.2 times in weight ratio respectively, to float on each colorless and transparent aqueous solution of sodium chloride.

Example 5

Figure 2:
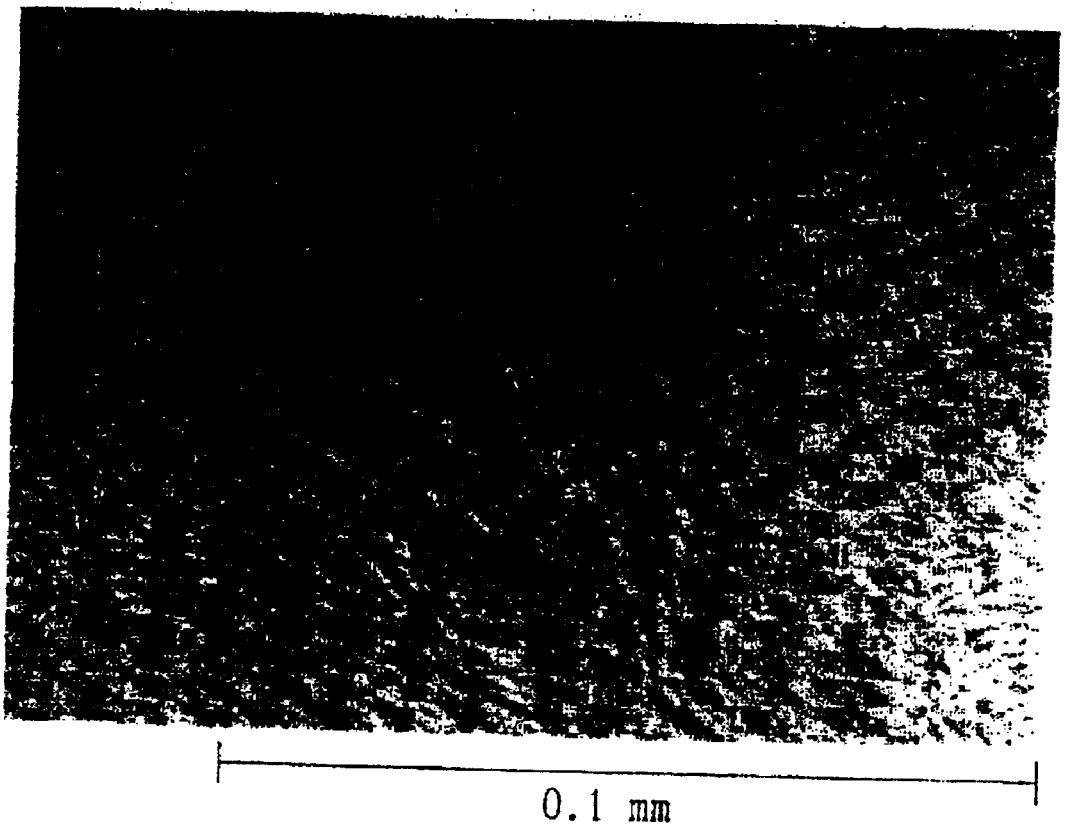
FIG. 2 is a microphotograph of the fibrous crystal aggregates obtained in Example 5.

The same procedure as in Example 1 was conducted except that 0.0005 mole of sodium decanoate was used in place of sodium pentadecanoate, and as a result, no fibrous crystal aggregates were precipitated even after an aqueous solution of sodium chloride was added thereto, stirred and left at room temperature. Accordingly, the mixture was further kept at 4° C. for one day, and as a result, similar fibrous crystal aggregates were precipitated, and the aggregates thus precipitated were stable for a long time even at room temperature. A microphotograph (×100) of the fibrous crystal aggregates of sodium pentadecanoate thus prepared is shown in FIG. 2. Similarly to Example 1, oil fuel C was added to the liquid in which the fibrous crystal aggregates were dispersed, and as a result, rigid solids could be obtained until the quantity of addition of oil fuel C to sodium caboxylate was 15.0 times in weight ratio.

Example 6

The same procedure as in Example 1, 3 or 4 was conducted except that n-Pentane, n-hexane, n-heptane, n-octane, benzene, toluene, o-xylene, 2,2,4-trimethyl pentane, 1-decene, cyclohexane, oil fuel A, liquid paraffin, gas oil or kerosene was used respectively in place of oil fuel C, and as a result, very rigid ball-shaped solids could be obtained until the ratio thereof to sodium pentadecanoate was from 15 to 70 times in weight ratio respectively. The remaining pure water or aqueous solution remained colorless and transparent or slightly opaque. By heating the solidified material at 60 to 90° C., the original oil component could be easily recovered.

Example 7

10 g sodium pentadecanoate in a high purity (99% or more) and 400 g water were weighed and placed in a glass vessel, sealed and heated at 95° C., whereby the sodium pentadecanoate was completely dissolved. Separately, an aqueous solution prepared by completely dissolving 5 g sodium chloride in 400 g water was heated at 95° C. Both the solutions were mixed at 95° C., and immediately the mixture was vigorously stirred. The mixture was stirred for about 20 minutes until the mixture was cooled to room temperature, whereby very fine and uniform fibrous crystal aggregates were precipitated throughout the solution. By leaving it at room temperature for 1 day, the fibrous crystal aggregates were made more stable and tried to gather on the water by attraction of the aggregates to one another in the form of fine crystals, thus made the aqueous solution slightly colorless and transparent in a lower part. A microphotograph (×40) of the fibrous crystal aggregates of sodium pentadecanoate thus prepared was the same as in FIG. 1.

150 g waste cottonseed salad oil was added to the liquid in which the fibrous crystal aggregates were dispersed (content of the fibrous crystal aggregates was 1.3% by weight, the balance being water) and gently stirred, whereby the fibrous crystal aggregates of sodium pentadecanoate and fine droplets of the waste oil started mutually to aggregate to form huge rigid and slightly yellowish ball-shaped aggregates as a whole. The remaining aqueous solution was free of sodium pentadecanoate and waste oil and completely colorless and transparent. Further, the huge rigid ball-shaped complexes contained little water. When additional waste oil was added, the oil was adsorbed completely by the ball-shaped complexes.

Example 8

The same procedure as in Example 7 was conducted except that 9 to 12 g sodium undecanoate, sodium dodecanoate, sodium tridecanoate, sodium tetradecanoate, sodium heptadecanoate or sodium octadecanoate was used respectively in place of sodium pentadecanoate in Example 7, and as a result, rigid stable macroscopic ball-shaped complexes were obtained until the ratio of waste cottonseed salad oil to each of sodium carboxylates was 20, 25, 25, 20, 30 and 30 times in weight ratio respectively, to float on each colorless and transparent aqueous solution of sodium chloride.

Example 9

The same procedure as in Example 7 was conducted except that soybean oil, rapeseed oil, corn oil, safflower salad oil, palm oil, rice oil, sesame oil or olive oil, each of which was waste oil, was used respectively in place of waste cottonseed salad oil in Example 7, and as a result, very rigid macroscopic ball-shaped complexes were obtained until the ratio thereof to fibrous crystal aggregate was 10 to 50 times in weight ratio. The remaining aqueous water or aqueous solution remained colorless and transparent or slightly opaque.

Example 10

The same procedure as in Example 7 was conducted except that pure water was used in place of water in Example 7, and as a result, fibrous crystal aggregates were obtained. A microphotograph (×40) of the fibrous crystal aggregates of sodium pentadecanoate thus prepared was the same as in FIG. 1.

150 g cottonseed salad oil was added to the liquid in which the fibrous crystal aggregates were dispersed and gently stirred, whereby the fibrous crystal aggregates of sodium pentadecanoate and fine droplets of the cottonseed salad oil started mutually to aggregate, to form huge rigid and slightly yellowish ball-shaped aggregates (solidified materials) as a whole. The remaining aqueous solution of sodium chloride was free of sodium pentadecanoate and cottonseed salad oil and completely colorless and transparent. Further, the huge rigid ball-shaped solidified materials contained little water.

Example 11

The same procedure as in Example 7 was conducted except that cottonseed salad oil, soybean oil, rapeseed oil, corn oil, safflower salad oil, palm oil, sunflower oil, rice oil, sesame oil or olive oil, which were edible oil, was used oil respectively in place of waste cottonseed salad oil in Example 7, and as a result, very rigid ball-shaped solidified materials could be formed until the ratio thereof to fibrous crystal aggregate was from 10 to 50 times in weight ratio. The remaining pure water or aqueous solution remained colorless and transparent or slightly opaque. The solidified materials could be easily returned to the original edible oil by heating at 60 to 80° C.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method of recovering flowing oil, which comprises the step of: solidifying oil flowing into rivers, lakes, marshes or the sea, by adding a recovering material thereto, wherein said recovering material comprises fibrous crystal aggregates which are crystal substances which are formed by making a metal aliphatic carboxylate dissolve completely in pure water to give a solution, stirring and gradually cooling the solution thus precipitating said fibrous crystal aggregates.

2. A method of recovering flowing oil, which comprises the steps of: heating a solidified material containing flowing oil, obtained by the method according to claim 1, to decompose and separate the solidified material into its original metal aliphatic carboxylate and flowing oil; and recovering them.

3. A method of recovering flowing oil, which comprises the step of: solidifying oil flowing into rivers, lakes, marshes or the sea, by adding a recovering material thereto, wherein said recovering material comprises fibrous crystal aggregates which are crystal substances which are formed by making a metal aliphatic carboxylate dissolve completely in sure water to give a solution, adding an aqueous solution of an inorganic salt containing the same metal as in the metal aliphatic carboxylate, stirring, and gradually cooling the solution thus precipitating said fibrous crystal aggregates.

4. A method of recovering flowing oil, which comprises the steps of: heating a solidified material containing flowing oil, obtained by the method according to claim 3, to decompose and separate the solidified material into its original metal aliphatic carboxylate and flowing oil; and recovering them.

5. A method of solidifying liquid hydrocarbon, which comprises the step of: solidifying liquid hydrocarbon by adding fibrous crystal aggregates thereto, wherein said fibrous crystal aggregates are crystal substances which are formed by making a metal aliphatic carboxylate dissolve completely in pure water to give a solution, stirring, and gradually cooling the solution thus precipitating said fibrous crystal aggregates.

6. A method of solidifying liquid hydrocarbon, which comprises the steps of: heating a solidified complex containing solidified liquid hydrocarbon, obtained by the method according to claim 5, to decompose and separate the solidified complex into its original metal aliphatic carboxylate and liquid hydrocarbon; and recovering them.

7. A method of solidifying liquid hydrocarbon, which comprises the step of: solidifying liquid hydrocarbon by adding fibrous crystal aggregates thereto, wherein said fibrous crystal aggregates are crystal substances which are formed by making a metal aliphatic carboxylate dissolve completely in pure water to give a solution, adding an aqueous solution of an inorganic salt containing the same metal as in the metal aliphatic carboxylate, stirring, and gradually cooling the solution thus precipitating said fibrous crystal aggregates.

8. A method of solidifying liquid hydrocarbon, which comprises the steps of: heating a solidified complex containing solidified liquid hydrocarbon, obtained by the method according to claim 7, to decompose and separate the solidified complex into its original metal aliphatic carboxylate and liquid hydrocarbon; and recovering them.

* * * * *